(12) United States Patent
Sakaguchi

(10) Patent No.: US 8,368,772 B2
(45) Date of Patent: Feb. 5, 2013

(54) IMAGING APPARATUS

(75) Inventor: Norihiro Sakaguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1153 days.

(21) Appl. No.: 11/785,390

(22) Filed: Apr. 17, 2007

(65) Prior Publication Data

US 2007/0280548 A1    Dec. 6, 2007

(30) Foreign Application Priority Data

May 2, 2006    (JP) ................................ 2006-128306

(51) Int. Cl.
*H04N 5/228* (2006.01)

(52) U.S. Cl. ............... 348/222.1; 348/223.1; 348/224.1; 348/362

(58) Field of Classification Search ............... 348/222.1, 348/552, 223.1, 227.1, 228.1, 229.1, 362
See application file for complete search history.

(56) References Cited

U.S. PATENT DOCUMENTS

| | | | |
|---|---|---|---|
| 5,534,916 A | 7/1996 | Sakaguchi | |
| 5,774,623 A | 6/1998 | Maeda et al. | |
| 6,075,562 A | 6/2000 | Sakaguchi et al. | |
| 6,597,402 B1 * | 7/2003 | Butler et al. | 348/447 |
| 2003/0044066 A1 | 3/2003 | Sakaguchi | |
| 2003/0146984 A1 | 8/2003 | Sakaguchi et al. | |
| 2003/0169346 A1 * | 9/2003 | Ojima et al. | 348/207.99 |
| 2003/0174236 A1 | 9/2003 | Sakaguchi | |
| 2003/0223009 A1 | 12/2003 | Yoshida et al. | |
| 2005/0078201 A1 | 4/2005 | Sakaguchi | |

FOREIGN PATENT DOCUMENTS

JP    2005-0184391    7/2005

* cited by examiner

*Primary Examiner* — Yogesh Aggarwal
(74) *Attorney, Agent, or Firm* — Dickstein Shapiro LLP

(57) ABSTRACT

An imaging apparatus is disclosed. The imaging apparatus includes
an imaging device, wherein a frame of an image is divided into 3 or more fields, the fields are output one by one, and each field contains full color information,
a drive circuit for driving the imaging device at predetermined timing,
a timing generating circuit for generating the timing, and
a signal processing unit for processing an output of the imaging device to generate a brightness signal and a color signal. With the imaging apparatus, an image that is signal-processed only with a first field of the imaging frame is stored in addition to an ordinarily signal-processed image.

12 Claims, 6 Drawing Sheets

IMAGING APPARATUS

BACKGROUND OF THE INVENTION

1. Field of the Invention

The present invention generally relates to imaging apparatuses, such as a digital camera, and especially relates to an imaging apparatus that has a function of recovering from a fault generated by, e.g., being dropped.

2. Description of the Related Art

For example, Patent Reference 1 discloses "an imaging apparatus and an abnormality detection method", wherein the imaging apparatus outputs image data from an imaging device, which image data for one frame are divided into two or more fields. According to this technology, an abnormal condition of the imaging apparatus is detected and reported to a user. The abnormal condition includes luminous leakage of an optical mirror body, and an abnormal operation of a mechanical shutter. According to this technology, the mechanical shutter of the imaging apparatus is arranged in an optical path between a pick-up lens system and a CCD solid-state imaging device, which mechanical shutter opens and closes the optical path such that exposure of the CCD solid-state imaging device is controlled. The CCD solid-state imaging device outputs an image, wherein a frame of the image is divided into 3 fields. A CPU compares exposure amounts of at least two of the fields of the frame, and detects an abnormal condition of the mechanical shutter, and the like, based on a difference in the exposure amounts. If an abnormal condition is detected, the CPU displays a screen for reporting the error, providing a solution, etc., on a display apparatus through a display interface.

[Patent Reference 1] JPA 2005-184391

With the conventional imaging apparatus using an interlace read-out CCD as an imaging device, wherein an image of one frame is structured by two or more fields, when a charge of the first field is moved to a transmission path, data of remaining fields are held in respective pixels. Accordingly, a shutter for shading is required. If a fault (abnormality) arises with the shutter by, e.g., the user dropping the imaging apparatus, the remaining fields are exposed greater than the first field. This prevents correct reproduction of the image.

SUMMARY OF THE INVENTION

The present invention provides an imaging apparatus that substantially obviates one or more of the problems caused by the limitations and disadvantages of the related art.

The present invention provides an imaging apparatus that is capable of providing a high quality image even when a fault of a shutter, and the like, occurs.

Features of embodiments of the present invention are set forth in the description which follows, and in part will become apparent from the description and the accompanying drawings, or may be learned by practice of the invention according to the teachings provided in the description. Problem solutions provided by an embodiment of the present invention may be realized and attained by an imaging apparatus particularly pointed out in the specification in such full, clear, concise, and exact terms as to enable a person having ordinary skill in the art to practice the invention.

To achieve these solutions and in accordance with an aspect of the invention, as embodied and broadly described herein, an embodiment of the invention provides an imaging apparatus as follows.

Means for Solving a Problem

The imaging apparatus includes an imaging device for full-color outputting a field that is read in one time, wherein 3 or more fields constitute a frame of an image, a drive circuit for driving the imaging device at a predetermined timing, a timing generating circuit for generating timing, and a signal processing unit for processing an output of the imaging device into a brightness signal and a color signal, wherein an image that is signal-processed only with the first field of the imaging device is stored in addition to an ordinarily signal-processed image.

An aspect of the embodiment provides the imaging apparatus, wherein raw data of only the first field of the imaging device are stored in addition to the ordinarily signal-processed image.

An aspect of the embodiment provides the imaging apparatus, wherein raw data of at least two fields are compared, and signal processing is carried out only with the raw data of the first field if a level difference is great.

An aspect of the embodiment provides the imaging apparatus, wherein raw data of at least two fields are compared, and raw data of the first field are stored in addition to an ordinarily signal-processed image if the level difference is great.

An aspect of the embodiment provides the imaging apparatus, wherein raw data of at least two fields are compared; then, a signal is processed with the raw data of the first field, and raw data of the first field are stored in addition to an ordinarily signal-processed image if the level difference is great.

According to another aspect of the embodiment, the imaging apparatus includes an abnormality detecting unit for detecting an abnormality of the imaging apparatus, wherein a signal is processed only with the raw data of the first field if the abnormality detecting unit detects an abnormality.

Another aspect of the embodiment provides the imaging apparatus wherein the raw data of the first field are stored in addition to the ordinarily signal-processed image if the abnormality detecting unit detects an abnormality.

Another aspect of the embodiment provides the imaging apparatus wherein an image is signal-processed with the raw data of the first field, and the raw data of the first field are stored in addition to the ordinarily signal-processed image if the abnormality detecting unit detects an abnormality.

According to another aspect of the embodiment, a user can select one of storing the raw data of the first field, and signal-processing with the first field.

Effectiveness of Invention

According to the embodiment of the present invention, even if a fault occurs with the shutter, and the like, a high quality image can be taken.

DESCRIPTION OF THE PREFERRED EMBODIMENTS

In the following, embodiments of an imaging apparatus according to the present invention are described with reference to the accompanying drawings.

[Embodiments]

A digital camera is described as an exemplary embodiment of the imaging apparatus according to the present invention. The digital camera is described in this embodiment as using a primary-color system CCD imaging device that includes a primary-color system filter of R (red), G (green), and B (blue). Nevertheless, the present invention also applies to an imaging apparatus that uses a complementary-color system imaging device using a complementary-color system filter of Ye (yellow), Cy (cyan), Mg (magenta), and G (green).

Figure 1:
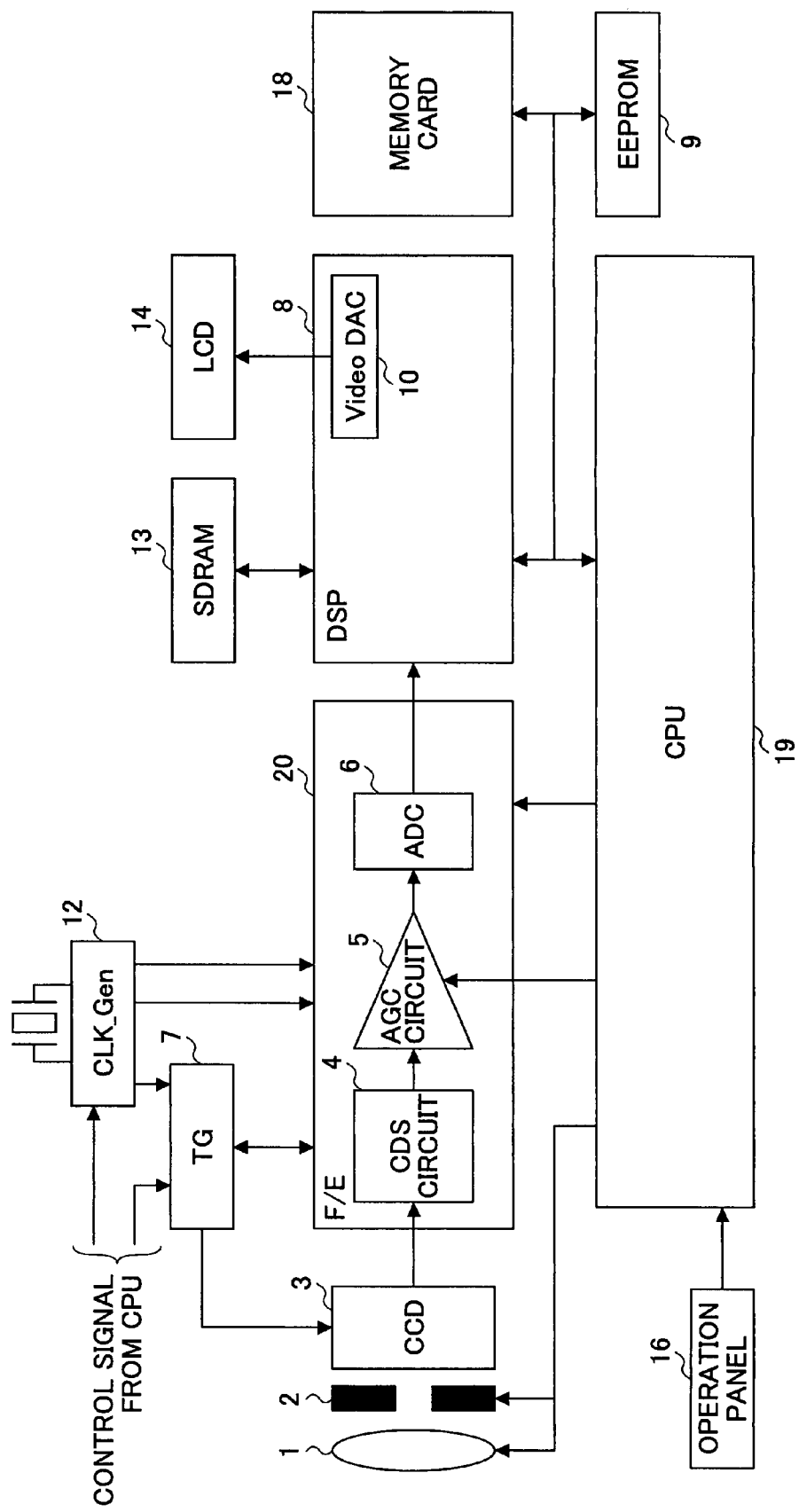
FIG. 1 is a block diagram showing the principal part of a digital camera according to an example of an embodiment of the present invention.

As shown in FIG. 1, the digital camera according to the embodiment includes
a pick-up lens system 1,
a mechanical shutter 2,
a CCD (charge coupled device) solid-state imaging device 3 (CCD 3),
a F/E (front end processor) 20 serving as a signal processing unit,
a TG (timing generator) 7 for generating timing,
a CLK_Gen (clock generator) 12,
a DSP (digital signal processor) 8 that is a signal processing IC (integrated circuit),
a SDRAM (synchronous dynamic random access memory) 13 serving as a temporary storage for reading/writing (R/W) raw data produced by AD conversion of a CCD output and data that are signal-processed,
an EEPROM (electrically erasable programmable read-only memory) 9 for storing data such as an adjustment value,
a LCD (liquid crystal display) 14 for monitoring, displaying a reproduced image, and displaying various information items,
an operations panel 16,
a memory card 18, and
a CPU (central processor unit) 19.
Further, as shown in FIG. 1, the F/E 20 includes
a CDS (correlated double sampling) circuit 4,
an AGC circuit 5, and
an ADC (analog-to-digital converter) 6. Further, the DSP 8 includes a Video DAC (digital-to-analog converter) 10, and other non-illustrated units such as a compression unit, a CCD interface, a memory controller, a LCD interface, and a YUV converter.

The pick-up lens system 1 is for forming an image of a photographic target on a light receiving surface of the CCD solid-state imaging device 3. The mechanical shutter 2 is arranged in an optical path between the pick-up lens system 1 and the CCD solid-state imaging device 3, opens and closes the optical path, and limits exposure of the CCD solid-state imaging device 3. That is, when the mechanical shutter 2 is open, the CCD solid-state imaging device 3 is exposed to the photographic target by an incident light through the pick-up lens system 1; and when the mechanical shutter 2 is closed, the incident light to the CCD solid-state imaging device 3 is blocked. The CCD solid-state imaging device 3 converts an optical image that is formed on the light receiving surface into an electrical signal, temporarily holds the electrical signal, divides a frame of the image into 3 fields, and outputs the fields one by one.

The F/E 20 including the CDS circuit 4, the AGC circuit 5, and the ADC 6 processes the signal provided by the CCD solid-state imaging device 3. Specifically, the CDS circuit 4 carries out correlated double sampling of the signal from the CCD solid-state imaging device 3. The AGC circuit 5 carries out AGC of the correlated double sampling output of the CDS circuit 4, and adjusts the signal to a predetermined level. The ADC 6 converts the output, which is analog, of the AGC circuit 5 into digital data (digital image data).

The TG 7 responds to a synchronous drive signal provided by the CCD interface (not illustrated) of the DSP 8. The synchronous drive signal includes a VD signal (vertical synchronous drive signal) and a HD signal (horizontal synchronous drive signal). The TG 7, in cooperation with the CPU 19, provides a timing signal to the CCD solid-state imaging device 3, the CDS circuit 4, the AGC circuit 5, and the ADC 6 such that these units are in sync.

The DSP 8
stores the digital image data in the SDRAM 13, which digital image data are provided by the ADC 6 of the F/E 20 based on communications with the CPU 19,
performs required signal processing such as compression and YUV conversion,
stores the data that are processed by the DSP 8 in the SDRAM 13,
displays the digital image data that are provided by the ADC 6 and read out from the SDRAM 13 on the LCD 14,
performs compression processing and YUV conversion of the digital image data that are provided by the ADC 6 and read out from the SDRAM 13, and
stores the digital image data read out from the SDRAM 13 in the memory card 18.

The CCD interface (not illustrated) of the DSP 8 receives the digital image data from the ADC 6, stores the data in the SDRAM 13 through the memory controller (not illustrated), requests for characteristic data, such as an integration value of a specific part of a brightness signal, and provides the characteristic data to the CPU 19. Further, the memory controller controls data read from and written to the SDRAM 13 based on control of the CPU 19, which data include
original RGB (RAW-RGB) data provided through the CCD interface (not illustrated),
YUV data obtained by applying YUV conversion to the RAW-RGB data by the YUV converter (not illustrated), and
JPEG data compressed by the compression unit (not illustrated) according to a JPEG (Joint Photographic Experts Group) method. Further, the LCD interface provides the image data copied from the SDRAM 13 to the LCD 14 for displaying. Further, the compression unit compresses the image data provided by the ADC 6 and read out from the SDRAM 13 by a predetermined compression method, for example, the JPEG method. Further, the YUV converter carries out YUV conversion of the image data provided by the ADC 6 and read out from the SDRAM 13 according to a control value that is provided by the CPU 19. Namely, the memory controller stores image data provided by the ADC 6 in the SDRAM 13, reads out image data from the SDRAM 13, provides the image data to the LCD 14 for display through the LCD interface, reads out image data from the SDRAM 13, carries out compression processing according to, e.g., the JPEG method by the compression unit, and carries out the YUV conversion by the YUV converter, writes the compressed and YUV converted data to the SDRAM 13, and reads out data from the SDRAM 13 and writes the data to the memory card 18.

The SDRAM 13 stores the original RGB data, the YUV data, and the JPEG data. Here, the LCD 14 shown in FIG. 1 is for displaying an image based on the image data provided by the ADC 6 and read out from SDRAM 13 through the LCD interface; further, the LCD 14 is for displaying a report, a solution, and the like when an abnormal condition is detected.

The operations panel 16 includes at least one of a release switch for directing picture taking, a mode switch for switching modes, other switches, a key, a lever, and a dial plate such that information including an operational direction, a setting direction, and a selection direction, is provided to the CPU 19 of the digital camera.

The memory card 18 is a small IC memory device such as a "smart card" that contains a semi-conductor non-volatile memory like the so-called flash memory. The memory card 18 can be attached to and detached from a slot provided to the digital still camera. The memory card 18 is for storing, e.g., image data compressed by the JPEG method and stored in the SDRAM 13 and read out through the memory controller by control of the CPU 19.

The CPU 19 controls the functional units described above, and controls the ordinary photographic operation. In addition, the CPU 19 compares exposure amounts of at least two fields of the image data of a frame, which image data are divided into 3 fields. Further, the CPU 19, serving as the abnormality detecting unit, determines whether there is an abnormality in operations of, e.g., the mechanical shutter 2 based on a difference between the exposure amounts.

Further, CPU 19 calculates such as AE (automatic exposure setting), AF (automatic focusing), and a white balance; sets up parameters for the DSP 8, the F/E 20 and others; and processes an operation of the user. As for AE, for example, an integrated value of a brightness signal from the CCD 3 at the time of monitoring is acquired by the DSP 8 so that the CPU 19 controls an aperture and a shutter speed based on the integrated value that serves as an evaluation value. In addition, the DSP 8 generates evaluation values for AF and the white balance, and the CPU 19 operates based on the evaluation values.

The digital camera according to the embodiment as shown in FIG. 1 further includes a motor driver (not illustrated) and a voice output unit (not illustrated). Based on control of the CPU 19, the motor driver drives a lens drive motor (not illustrated) of the pick-up lens system 1 for focusing, zooming, and the like, and drives a shutter drive motor (not illustrated) of the mechanical shutter 2 for opening and closing the mechanical shutter 2 in association with the TG 7. The voice output unit provides sound such as an alarm when an abnormality is detected, and a voice announcement of a solution. Further, the voice output unit may be arranged so that an announcement of operational information, a sound for a self-timer operation, and the like can be provided during normal operations.

Further, the digital camera may include an abnormality detection sensor (abnormality detecting unit) for detecting a shock such as due to dropping of the digital camera.

Here, a common crystal oscillator can be used for generating the clock for driving the CCD by the TG 7; however, according to the embodiment, the clock is generated by the CLK_Gen (clock generator) 12, wherein output frequency of the clock is adjustable such that the DSP 8 and the system are in sync. The CLK_Gen 12 provides a clock for a peripheral device such as USB to the DSP 8 in addition to the system clock. The CLK_Gen 12 includes a multiplexer so that the output frequency can be adjusted by control of the CPU 19.

In the following, an example of operations of the digital camera according to the embodiment is described.

The output signal of the CCD 3, which is an analog signal, is processed by the CDS 4 and the AGC 5, converted to a digital signal by the ADC 6, and stored in the SDRAM 13 in a CCD pattern. In an ordinary still picture process, the CCD data stored in the SDRAM 13 are read, a brightness signal and a color signal are generated, compression is carried out by the compression unit, and the compressed data are stored in the memory card 18. Further, the raw data from the CCD 3 are converted into YUV or RGB for display, output from the Video DAC 10 of the DSP 8, and displayed by the LCD 14.

Specifically, the data generated by exposing a light receiving surface of the CCD solid-state imaging device 3 through the pick-up lens system 1 are converted into an electrical signal in the CCD solid-state imaging device 3, which electrical signal is an analog image signal. The image signal for one frame is perpendicularly divided into 3 fields, and the fields are output from the CCD solid-state imaging device 3 in three corresponding transmissions. The output analog image signal is provided to the F/E 20, wherein the signal passes through the CDS circuit 4 for the correlated double sampling, the AGC circuit 5 for level control, and the ADC 6 for A/D conversion to become a digital signal. The digital signal is provided to the memory controller through the CCD interface of the DSP 8, and is stored in the SDRAM 13 by the memory controller. At this time, the CCD interface acquires integration values of R (red), Gr (green of a red line), Gb (green of a blue line), and B (blue) for each of 256 areas (16×16, horizontally and vertically) of the frame.

The integration values are acquired for each field. The CPU 19 reads the integration values as characteristic data, and calculates, e.g., an automatic white balance (AWB). The RGB data in the SDRAM 13, when transmission of all the 3 fields are completed, are converted into YUV data by the YUV converter, and the YUV data are stored in the SDRAM 13. Control values, such as the automatic white balance calculated by the CPU 19, are used at the time of the YUV conversion. The YUV data are read again, and JPEG compression is carried out by the compression unit, and JPEG data are stored in the SDRAM 13. Header data, and the like, are attached to the JPEG data in the SDRAM 13. The JPEG data are formatted as JPEG image data containing photography information that follows, e.g., Exif, and are stored in the memory card 18 by the CPU 19.

EXAMPLE 1 OF THE EMBODIMENT

Figure 2:
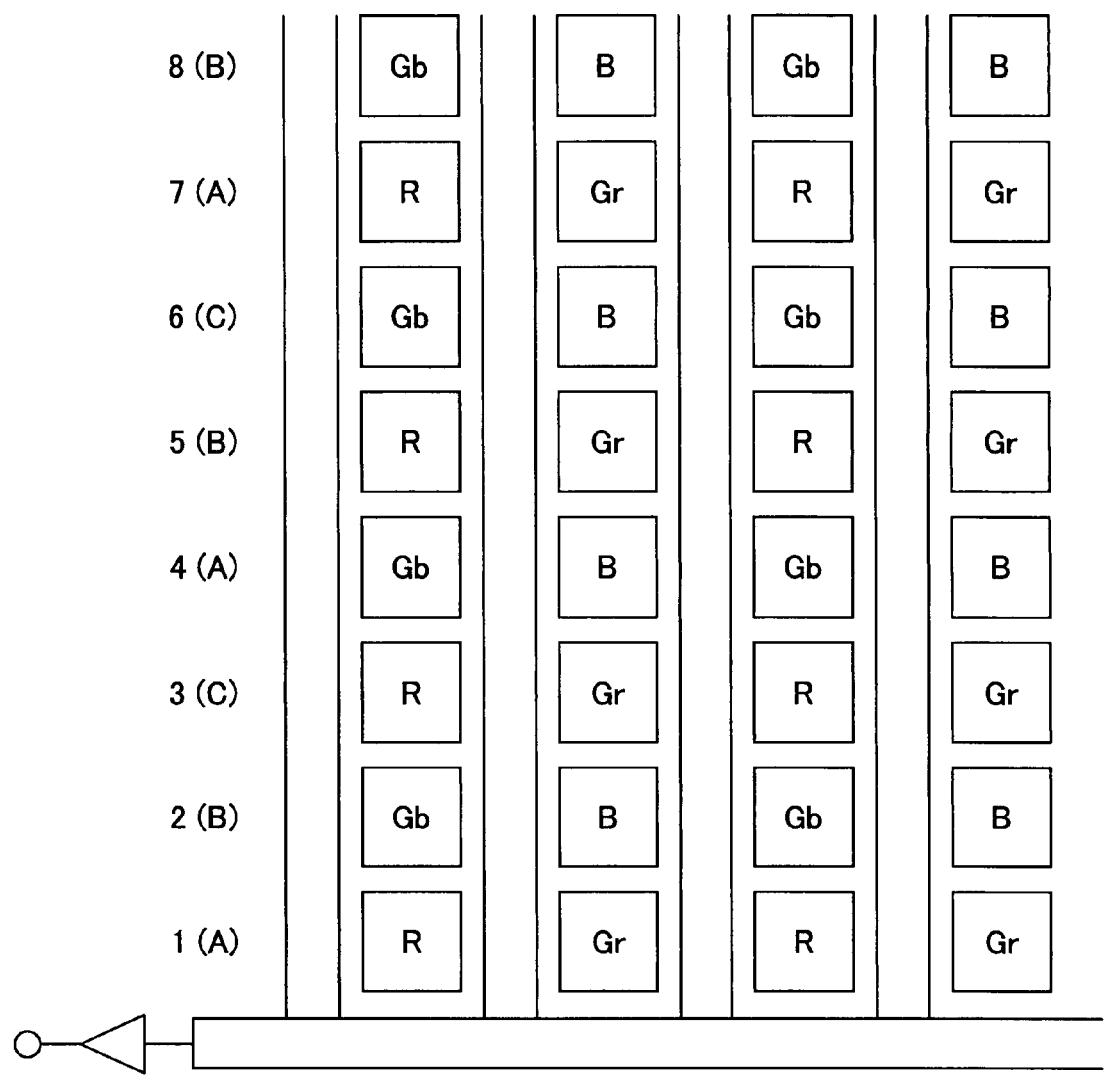
FIG. 2 is a schematic drawing showing the internal composition of a Bayer pattern 3-field read-out CCD of the digital camera according to the embodiment of the present invention.
Figure 3:
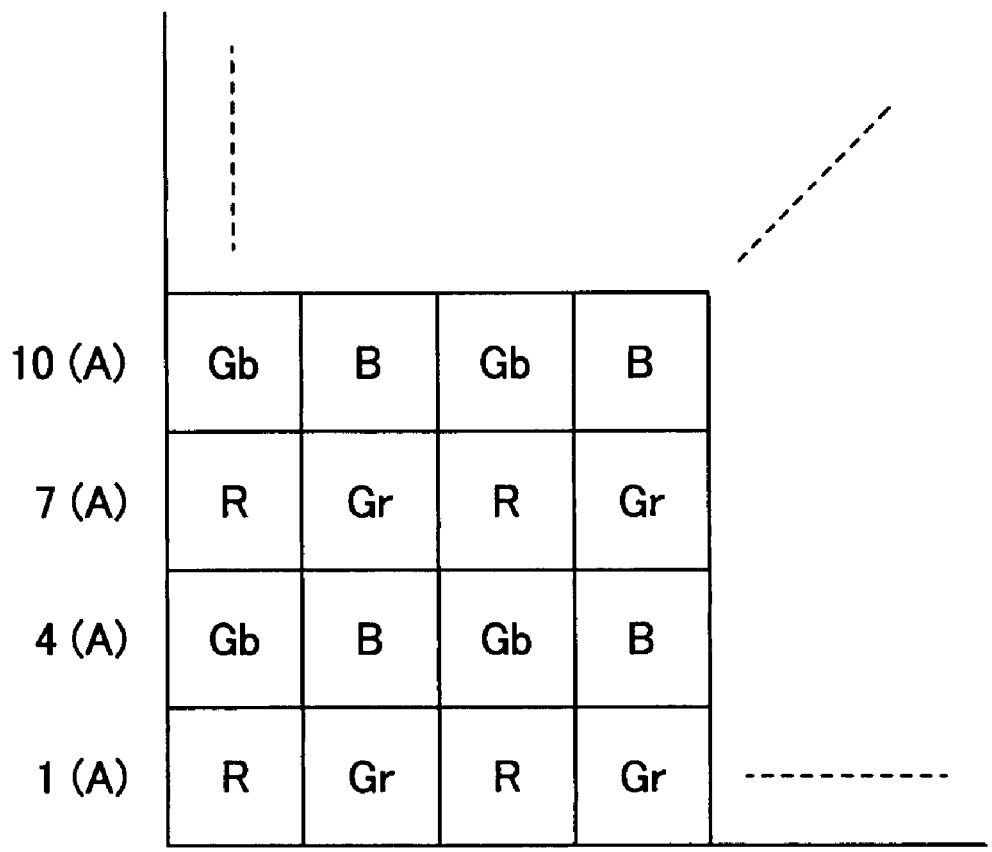
FIG. 3 is a pattern drawing showing an output of the first field of the digital camera according to the embodiment of the present invention.
Figure 4:
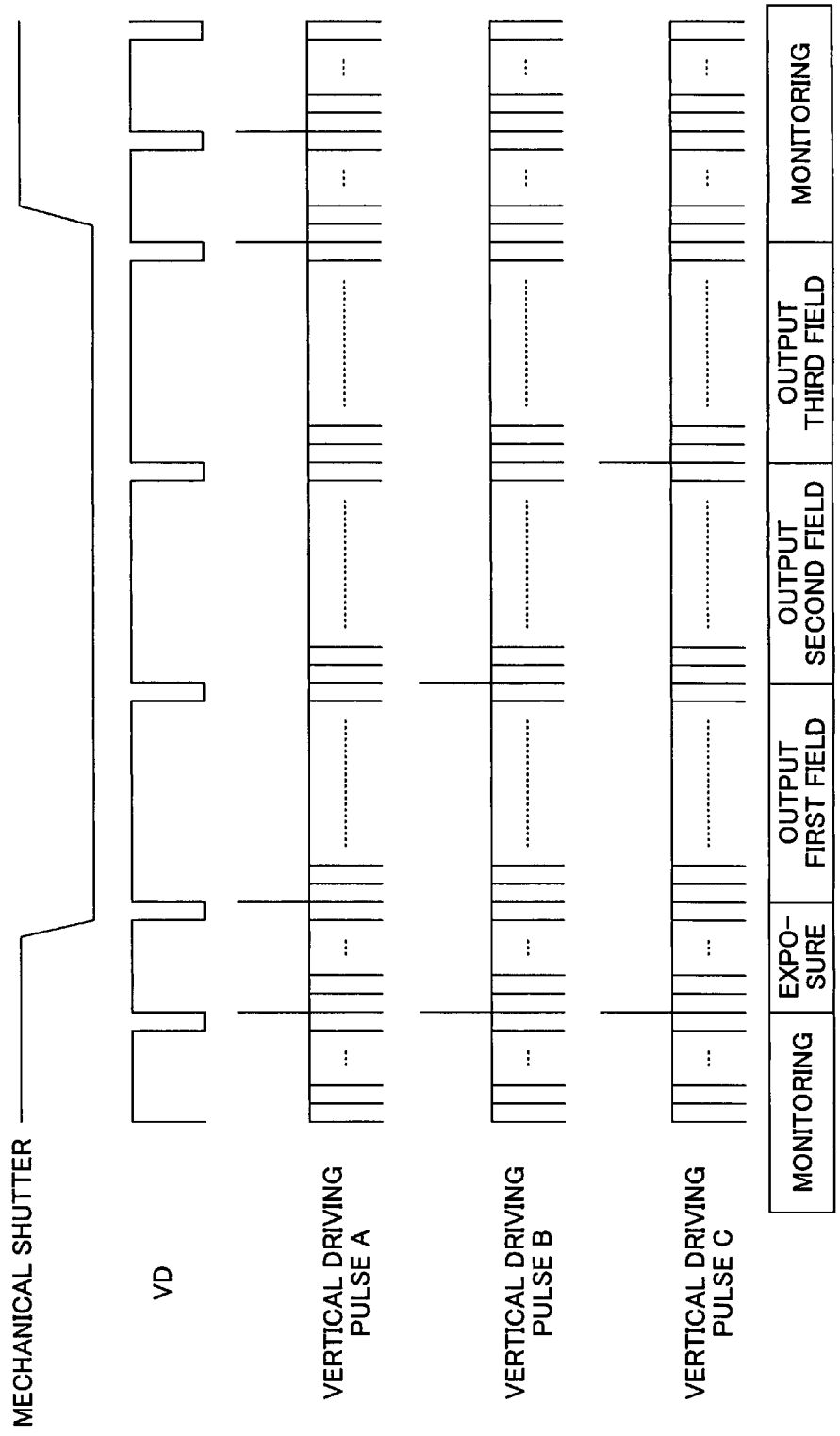
FIG. 4 is a timing chart showing read-out timing of the digital camera according to the embodiment of the present invention.

Example 1 of the embodiment is described referring to FIG. 2 that shows the internal structure of a Bayer pattern 3-field read-out CCD, and FIG. 4 that is a timing chart. With the 3-field read-out CCD, a frame is divided into 3 fields, namely, the first field called Line A, the second field called Line B, and the third field called Line C as shown in FIG. 2. For example, an output of the first field looks like as shown in FIG. 3; since this field contains four colors of R (red), Gr (green of a red line), Gb (green of a blue line), and B (blue), a brightness signal and a color signal can be reproduced. The same applies to the second and the third fields, except that a starting color is different as for the second field.

According to Example 1 of the operations of the digital camera configured as described above, an image that is signal-processed using only the raw data of the first field of the CCD is stored in addition to the ordinary signal processing. Whether the data of all the fields (three fields in the case of the example shown in FIG. 2) are to be used or the data of only the first field are to be used for signal processing can be determined by controlling read-out from the SDRAM 13 connected to the DSP 8 (ref. FIG. 1).

EXAMPLE 2 OF THE EMBODIMENT

Example 2 of the embodiment is different from Example 1 of the embodiment in that the former does not perform signal processing using only the first field of the CCD. Instead, Example 2 stores the raw data of only the first field of the CCD as they are. When generating an image file to be written to the memory card 18 by the DSP 8, the raw data are associated with the file and stored.

EXAMPLE 3 OF THE EMBODIMENT

Figure 5:
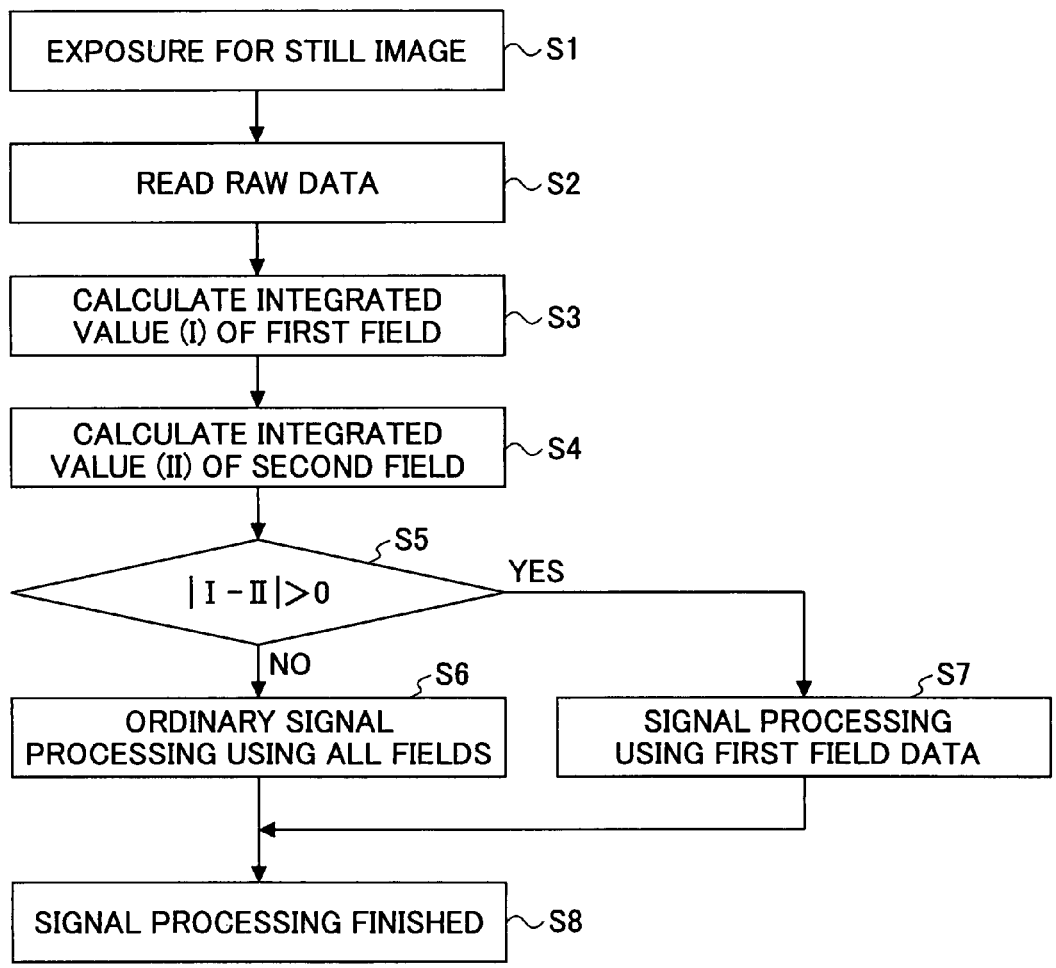
FIG. 5 is a flowchart showing an action option of Operation Example 3 of the digital camera according to the embodiment of the present invention.

When an abnormality occurs and the shutter does not completely close after exposure, the magnitude of a signal of the second field and so on becomes greater than the first field. When this situation is detected, one of the following actions is taken, namely, (1) an image that is signal-processed with the raw data of the first field is stored, (2) the raw data of the first field is stored, and (3) both the image that is signal-processed with the raw data of the first field and the raw data of the first field are stored. FIG. 5 is a flowchart of the action (1), and FIG. 6 is a flowchart of the action (2).

In the action (1) as shown in FIG. 5, first, a still picture is exposed (step S1), and raw data are read (step S2). Next, an integrated value (I) of the first field is calculated (step S3), and an integrated value (II) of the second field is calculated (step S4). Then, a difference between the integrated value (I) and the integrated value (II) is obtained (step S5). Here, for example, if the difference is greater than 0 (YES at step S5), signal processing is carried out using the raw data of the first field (step S7), and signal processing is completed (step S8). Otherwise, if the difference is less than or equal to 0 (NO at step S5), ordinary signal processing using all the fields is performed (step S6), and signal processing is completed (step S8). In this way, at least two sets of the raw data are compared, and if the level difference is great, signal processing is carried out using only the raw data of the first field.

Figure 6:
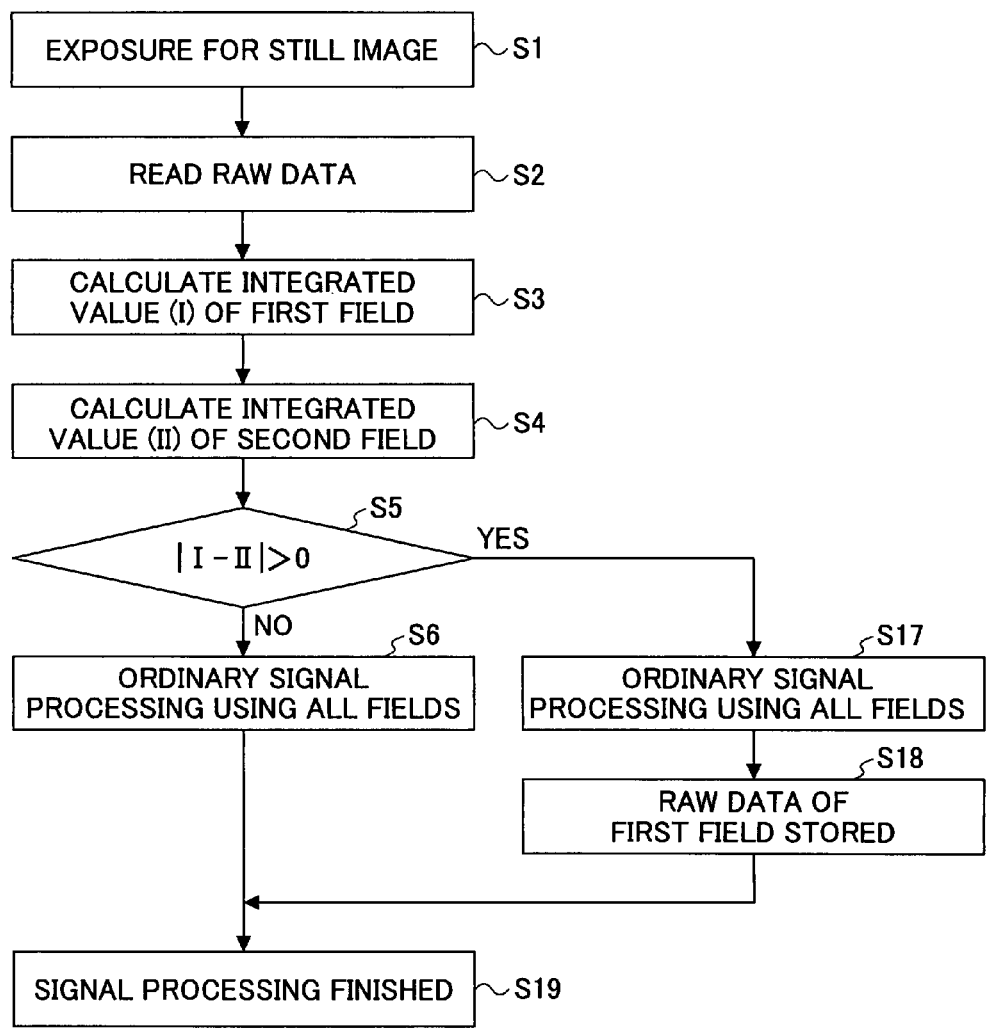
FIG. 6 is a flowchart showing another action option of Operation Example 3 of the digital camera according to the embodiment of the present invention.

In the action (2) as shown in FIG. 6, first, a still picture is exposed (step S1), and raw data are read (step S2). Next, the integrated value (I) of the first field is calculated (step S3), and the integrated value (II) of the second field is calculated (step S4). Then, the difference between the integrated value (I) and the integrated value (II) is obtained (step S5). If the difference is greater than 0 (YES at step S5), ordinary signal processing using all the fields is performed (step S17). Then, the raw data of the first field are held (step S18), and signal processing is completed (step S19). Otherwise, if the difference is less than or equal to 0 (NO at step S5), ordinary signal processing using all the fields is performed (step S6), and signal processing is completed (step S19). In this way, at least two sets of the raw data are compared, and if the level difference is great, both the ordinarily signal-processed image and the raw data of the first field are stored.

As for the action (3), both the image that is signal-processed with the raw data of the first field, and the raw data of the first field are stored at step S18 of FIG. 6.

EXAMPLE 4 OF THE EMBODIMENT

According to Example 4 of the embodiment, comparison between at least two sets of the raw data is triggered by a detection result of an abnormality detection sensor, and the like. That is, at step S5 of FIGS. 5 and 6, the abnormality detection sensor detects a shock to the digital camera. If a shock is detected, one of the actions (1), (2), and (3) are taken.

EXAMPLE 5 OF OPERATION

According to Examples 1 through 4 of the embodiment, there is a problem in that file size becomes great without intention of the user, an interval required between picture taking operations becomes long, and resolution is degraded. In order to solve this problem, Example 5 provides an "abnormality responding mode" that is different from the ordinary photography mode. In the "abnormality responding mode", the user can select between storage of the raw data of the first field and signal processing with the raw data of the first field.

[Availability to Industry]

The present invention is applicable to imaging apparatuses, such as a digital camera.

Further, the present invention is not limited to these embodiments, but variations and modifications may be made without departing from the scope of the present invention.

The present application is based on Japanese Priority Application No. 2006-128306 filed on May 2, 2006 with the Japanese Patent Office, the entire contents of that are hereby incorporated by reference.

What is claimed is:

1. An imaging apparatus, comprising:
    an imaging device, wherein a frame of an image is divided into three or more fields, the fields are output one by one, and each field contains full color information;
    a drive circuit for driving the imaging device at predetermined timing;
    a timing generating circuit for generating the timing; and
    a signal processing unit for processing an output of the imaging device to generate a brightness signal and a color signal, said signal processing unit being configured to process only a first field of the imaging frame to generate a first image, and to process all of the three or more fields of the imaging frame to generate a second image, both of said first and second images being generated and stored every time the imaging apparatus is operated.

2. The imaging apparatus as claimed in claim 1, wherein raw data of only the first field of the imaging frame are stored in addition to the second image.

3. The imaging apparatus as claimed in claim 1, wherein at least two sets of raw data are compared, and signal processing is carried out only with the raw data of the first field if a level difference between the sets is greater than a predetermined value.

4. The imaging apparatus as claimed in claim 1, wherein at least two sets of raw data are compared, and raw data of the first field are stored in addition to the second image if a level difference between the sets is greater than a predetermined value.

5. The imaging apparatus as claimed in claim 1, wherein at least two sets of raw data are compared, raw data of the first field and the first image that is signal-processed with the raw data of the first field are stored in addition to the second image if a level difference between the sets is greater than a predetermined value.

6. The imaging apparatus as claimed in claim 1, further comprising: an abnormality detecting unit for detecting an abnormality of the imaging apparatus; wherein signal processing is carried out only with raw data of the first field if an abnormality is detected by the abnormality detecting unit.

7. The imaging apparatus as claimed in claim 6, wherein the raw data of the first field are stored in addition to the second image if an abnormality is detected by the abnormality detecting unit.

8. The imaging apparatus as claimed in claim 6, wherein the raw data of the first field and the first image that is signal-processed with the raw data of the first field are stored in addition to the second image if an abnormality is detected by the abnormality detecting unit.

9. The imaging apparatus as claimed in claim 1, wherein a user can determine whether the raw data of the first field are to be stored, or signal processing is to be carried out with the first field.

10. The imaging apparatus as claimed in claim 3, wherein the level difference is a difference between integrated values of two fields of the imaging frame.

11. The imaging apparatus as claimed in claim 4, wherein the level difference is a difference between integrated values of two fields of the imaging frame.

12. The imaging apparatus as claimed in claim 5, wherein the level difference is a difference between integrated values of two fields of the imaging frame.

* * * * *